United States Patent
Labarriere et al.

(10) Patent No.: US 7,856,076 B2
(45) Date of Patent: Dec. 21, 2010

(54) TERMINAL END-PIECE FOR A FUEL ASSEMBLY HAVING A NOSE FOR ORIENTING THE FLOW OF COOLANT FLUID AND CORRESPONDING ASSEMBLY

(75) Inventors: Eric Labarriere, Saint-Eloi (FR); Angelo Beati, Lyons (FR); Michel Bonnamour, Lyons (FR)

(73) Assignee: Areva NP, Courbevoie (FR)

( * ) Notice: Subject to any disclaimer, the term of this patent is extended or adjusted under 35 U.S.C. 154(b) by 96 days.

(21) Appl. No.: 10/584,168

(22) PCT Filed: Dec. 17, 2004

(86) PCT No.: PCT/FR2004/003299

§ 371 (c)(1),
(2), (4) Date: Jun. 22, 2006

(87) PCT Pub. No.: WO2005/066976

PCT Pub. Date: Jul. 21, 2005

(65) Prior Publication Data

US 2007/0165767 A1 Jul. 19, 2007

(30) Foreign Application Priority Data

Dec. 22, 2003 (FR) .................................. 03 15183

(51) Int. Cl.
*G21C 3/06* (2006.01)
(52) U.S. Cl. .................... 376/453; 376/451; 376/434
(58) Field of Classification Search ................ 376/446, 376/440, 441, 451, 453, 442
See application file for complete search history.

(56) References Cited

U.S. PATENT DOCUMENTS

| 3,775,249 | A | | 11/1973 | Clapham | |
|---|---|---|---|---|---|
| 4,420,458 | A | * | 12/1983 | Dunlap et al. | 376/447 |
| 4,655,990 | A | | 4/1987 | LeClercq | |
| 4,655,995 | A | * | 4/1987 | Freeman et al. | 376/267 |
| 4,684,496 | A | * | 8/1987 | Wilson et al. | 376/352 |
| 4,772,447 | A | * | 9/1988 | Manson et al. | 376/441 |
| 4,818,473 | A | * | 4/1989 | Lui | 376/261 |
| 4,888,149 | A | * | 12/1989 | Bryan | 376/287 |
| 4,919,883 | A | | 4/1990 | Bryan | |
| 5,071,617 | A | * | 12/1991 | Bryan et al. | 376/352 |

(Continued)

FOREIGN PATENT DOCUMENTS

DE 41 14 004 11/1992

*Primary Examiner*—Rick Palabrica
(74) *Attorney, Agent, or Firm*—Davidson, Davidson & Kappel, LLC

(57) ABSTRACT

A terminal end-piece for a fuel assembly of a pressurized water nuclear reactor, the assembly having fuel rods and a skeleton for supporting the fuel rods, the fuel rods extending in a longitudinal direction and being arranged at the nodes of a substantially regular network, the support skeleton comprising two terminal end-pieces and guide tubes that connect the terminal end-pieces, the fuel rods being arranged longitudinally between the terminal end-pieces, characterized in that the end-piece comprises noses for orientating the flow of a coolant fluid of the reactor along the adjacent longitudinal ends of the fuel rods, the noses being arranged in nodes of the substantially regular network in order to be positioned in a longitudinal continuation of at least some of the fuel rods and/or at least some of the guide tubes of the support skeleton.

24 Claims, 12 Drawing Sheets

U.S. PATENT DOCUMENTS

| | | | |
|---|---|---|---|
| 5,094,802 A * | 3/1992 | Riordan, III | 376/352 |
| 5,180,545 A * | 1/1993 | Grattier | 376/352 |
| 5,255,297 A * | 10/1993 | Bryan | 376/352 |
| 5,533,078 A * | 7/1996 | Christiansen et al. | 376/438 |
| 5,793,832 A * | 8/1998 | Lettau | 376/442 |
| 6,310,931 B1 * | 10/2001 | Gustafsson et al. | 376/440 |
| 6,690,758 B1 * | 2/2004 | Elkins | 376/313 |

* cited by examiner

TERMINAL END-PIECE FOR A FUEL ASSEMBLY HAVING A NOSE FOR ORIENTING THE FLOW OF COOLANT FLUID AND CORRESPONDING ASSEMBLY

FIELD OF THE INVENTION

The present invention relates to a terminal end-piece for a nuclear reactor fuel assembly, the assembly comprising fuel rods and a skeleton for supporting the fuel rods, the fuel rods extending in a longitudinal direction and being arranged at the nodes of a substantially regular network, the support skeleton comprising two terminal end-pieces and elements for connecting the terminal end-pieces, the fuel rods being arranged longitudinally between the terminal end-pieces.

The invention is used in particular for constructing bottom end-pieces of fuel assemblies for pressurised water nuclear reactors (PWR).

BACKGROUND INFORMATION

EP-537 044 describes a bottom end-piece for such an assembly. That end-piece comprises a horizontal wall which is provided with feet for support on the lower plate of a nuclear reactor core. The elements for connecting the bottom end-piece to the top end-piece are constituted by guide tubes. Those guide tubes are fixed to the horizontal wall of the end-piece. The horizontal wall comprises reinforcement ribs under the lower surface thereof. In each zone of the horizontal wall delimited between the reinforcement ribs, holes for the passage of coolant water are provided so that the horizontal wall constitutes an anti-debris filter.

The coolant water flows in the core of the reactor vertically in an upward direction. More precisely, the water is introduced into the core through the lower core plate, then passes through the bottom end-piece by way of the above-mentioned holes before coming into contact with the outer surfaces of the fuel rods.

The water flows in the core at a very high ascending rate.

It has been found, during operation of the core, that the fuel rods, and in particular the lower ends thereof, were subjected to vibrations which are liable to damage them.

In greater detail, phenomena involving friction or "fretting" are liable to occur in particular between the lower grid of the support skeleton and the outer claddings of the fuel rods.

These friction phenomena may lead to damage to outer claddings which may bring about a release of fission gas or product in the water of the primary circuit.

SUMMARY

An objective of the invention is to overcome this problem by limiting the vibrations of the fuel rods of assemblies for a nuclear reactor.

To that end, the invention relates to a terminal end-piece for a nuclear reactor fuel assembly, the assembly comprising fuel rods and a skeleton for supporting the fuel rods, the fuel rods extending in a longitudinal direction and being arranged at the nodes of a substantially regular network, the support skeleton comprising two terminal end-pieces and elements for connecting the terminal end-pieces, the fuel rods being arranged longitudinally between the terminal end-pieces, characterised in that the end-piece comprises noses for orientating the flow of a coolant fluid of the reactor along the adjacent longitudinal ends of the fuel rods, the noses being arranged in nodes of the substantially regular network in order to be positioned in a longitudinal continuation of at least some of the fuel rods and/or at least some of the connection elements of the support skeleton.

According to specific embodiments, the end-piece may comprise one or more of the following features, taken in isolation or according to any technically possible combination:
- the noses converge in a direction which is intended to be orientated towards the outer side of the fuel assembly,
- at least some of the noses belong to members for fixing the terminal end-piece to connection elements of the support skeleton or fuel rods,
- the fixing members are screws,
- the end-piece comprises an arrangement for laterally maintaining adjacent longitudinal ends of the fuel rods, which the maintaining arrangement is arranged in nodes of the substantially regular network,
- the maintaining arrangement comprises housings for receiving the adjacent longitudinal ends of the fuel rods,
- the maintaining arrangement constitutes an arrangement for longitudinally securing the adjacent longitudinal ends of the fuel rods relative to the terminal end piece,
- the end-piece comprises two components for clamping between them the adjacent longitudinal ends of the fuel rods,
- the end-piece comprises an anti-debris filter,
- one of the components constitutes the anti-debris filter,
- the end-piece constitutes a bottom end-piece and
- the end-piece comprises feet for support on a lower plate of the nuclear reactor core.

The invention further relates to a fuel assembly for a nuclear reactor, the assembly comprising fuel rods and a skeleton for supporting the fuel rods, the fuel rods extending in a longitudinal direction and being arranged at the nodes of a substantially regular network, the support skeleton comprising two terminal end-pieces and elements for connecting the terminal end-pieces, the fuel rods being arranged longitudinally between the terminal end-pieces, characterised in that at least one end-piece is an end-piece as defined above.

According to specific embodiments, the assembly may comprise one or more of the following features, taken in isolation or according to any technically possible combination:
- the end-piece comprises an arrangement for laterally maintaining adjacent longitudinal ends of the fuel rods, which the maintaining arrangement is arranged in nodes of the substantially regular network,
- the maintaining arrangement comprises housings which receive the adjacent longitudinal ends of the fuel rods,
- the maintaining arrangement constitutes an arrangement for longitudinally securing the adjacent longitudinal ends of the fuel rods relative to the terminal end-piece,
- the end-piece comprises two components which clamp between them the adjacent longitudinal ends of the fuel rods,
- the longitudinal securing arrangement comprises projections that are provided on the end-piece and rings that are provided at the adjacent longitudinal ends of the fuel rods and which are fitted to those projections,
- the rings comprise relief portions for abutment against one of the components,
- the adjacent longitudinal ends of the fuel rods comprise widened feet which are clamped between the two components,
- the adjacent longitudinal ends of the fuel rods are expansion-rolled on the end-piece, the longitudinal securing arrangement comprises screws that abut the end-piece and which are engaged in the adjacent longitudinal ends of the fuel rods and the longitudinal securing arrangement is, for example, snap-fitting.

BRIEF DESCRIPTION OF THE DRAWINGS

The invention will be better understood from a reading of the following description given purely by way of example and with reference to the appended drawings.

DETAILED DESCRIPTION

Figure 1:
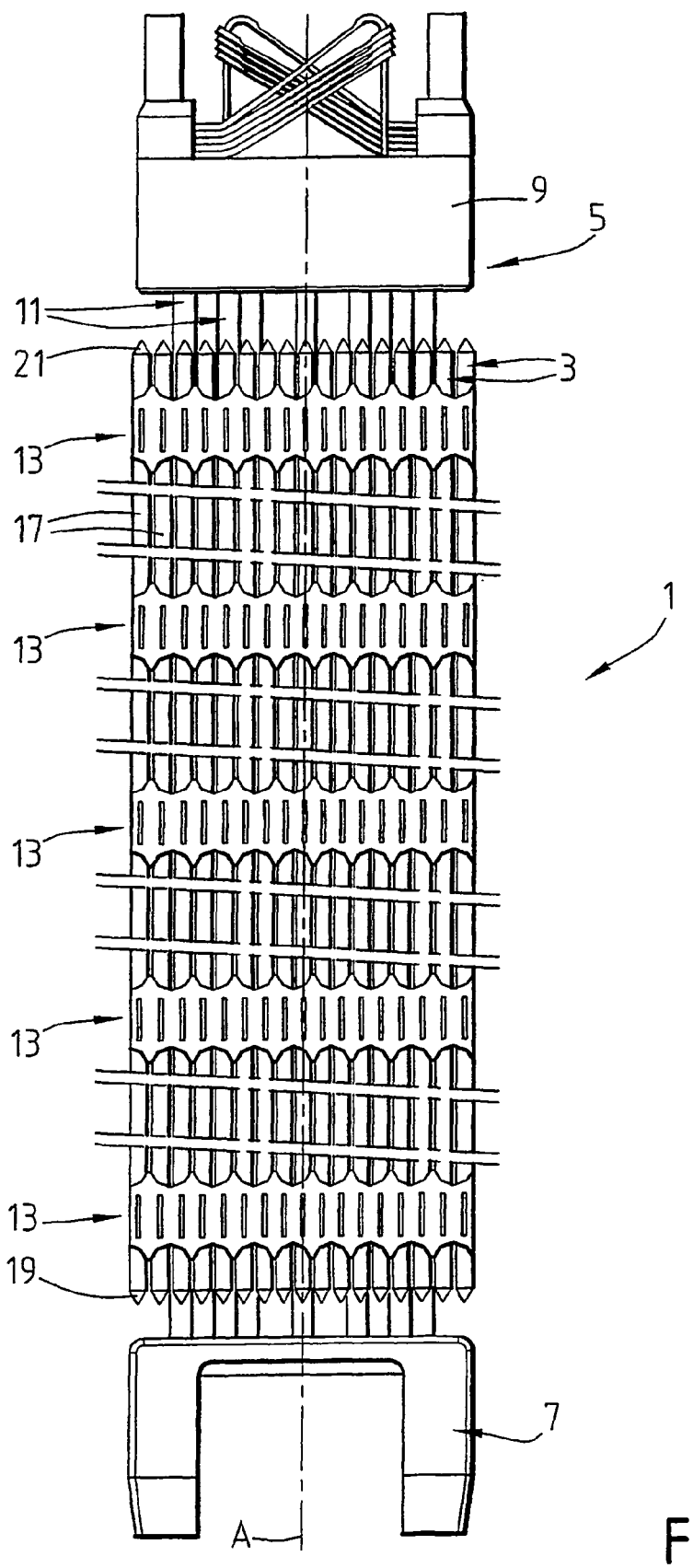
FIG. 1 is a schematic side view of a fuel assembly according to the prior art.

In order to illustrate the context of the invention, FIG. 1 schematically illustrates a nuclear fuel assembly 1 for a pressurized water reactor. Therefore, the water fulfils in that case a coolant and moderating function, for example, slowing down the neutrons produced by the nuclear fuel.

The assembly 1 extends vertically and in a rectilinear manner in a longitudinal direction A.

Conventionally, the assembly 1 principally comprises nuclear fuel rods 3 and a structure or skeleton 5 for supporting the rods 3.

The support skeleton 5 conventionally comprises:

a bottom end-piece 7 and a top end-piece 9 that are arranged at the longitudinal ends of the assembly 1, guide tubes 11 which are intended to receive the rods of an assembly (not illustrated) for controlling and stopping the nuclear reactor and grids 13 for maintaining the rods 3.

The end-pieces 7 and 9 are fixed to the longitudinal ends of the guide tubes 11.

Figure 2:
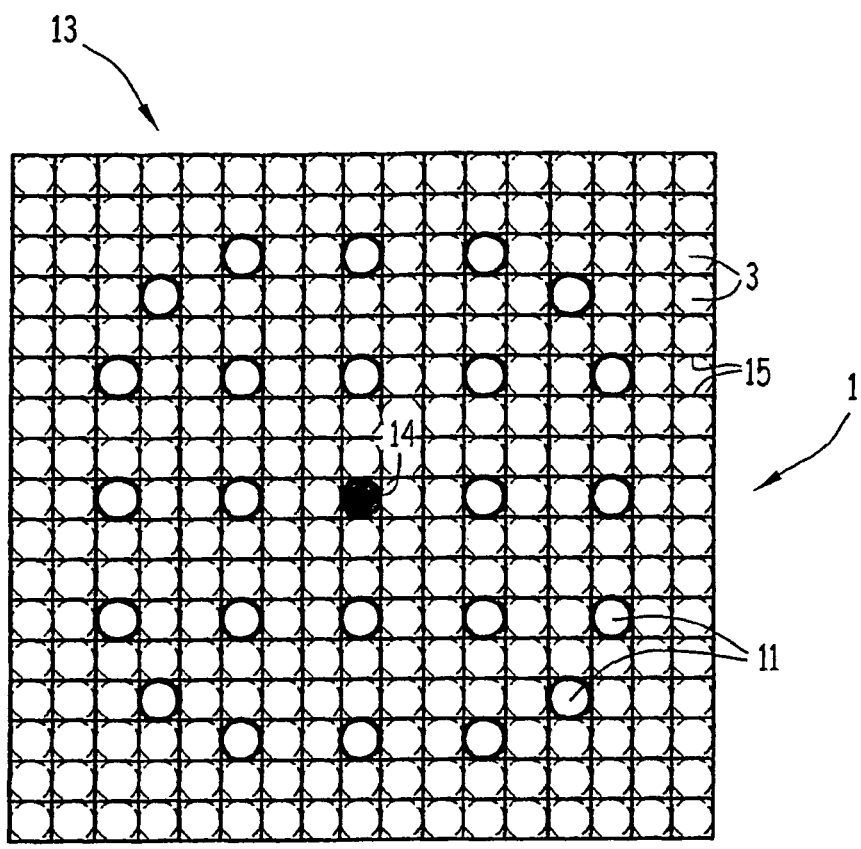
FIG. 2 is a schematic top view showing the distribution of the fuel rods in the assembly of FIG. 1.
Figure 4:
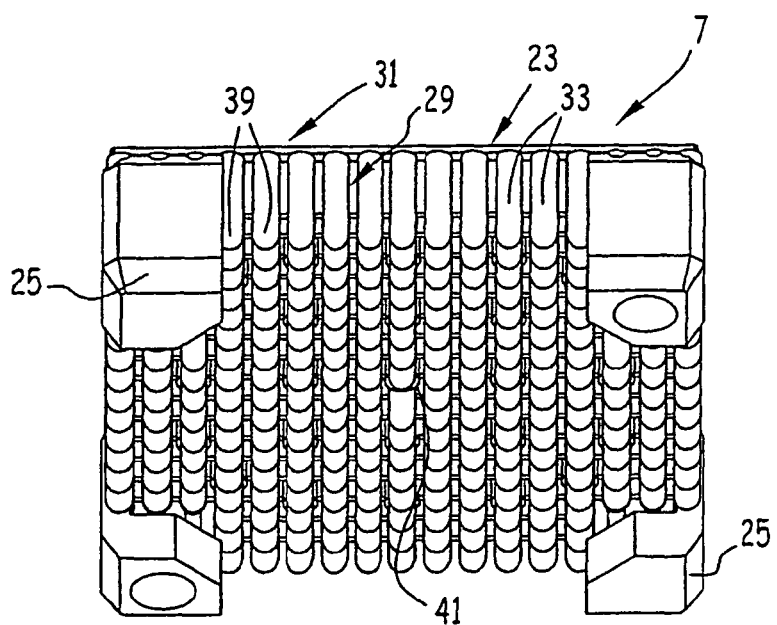
FIG. 4 is a schematic perspective view of the end-piece of FIG. 3.

The rods 3 extend vertically between the end-pieces 7 and 9. The rods 3 are arranged at the nodes of a substantially regular network having a square base, where they are maintained by the grids 13. Some of the nodes of the network are occupied by the guide tubes 11 and optionally by an instrumentation tube 14 which is visible at the centre of FIG. 2. In FIG. 2, the rods 3 are shown with dashed lines, the guide tubes 11 are shown with solid lines and the instrumentation tube 14 is shown using a solid black circle.

The grids 13 conventionally comprise sets of intersecting plates 15 which together delimit cells which are centred on the nodes of the regular network. Most of the cells are intended to receive a fuel rod 3. 24 cells each receive a guide tube 11 and the central cell receives the instrumentation tube 14.

In the example of FIGS. 1 and 2, the maintenance grids 13 comprise 17 cells per side and the regular network comprises the same number of nodes per side.

In other variants, the number of cells and nodes per side may be different, for example, in the order of 14×14 or 15×15.

Each rod 3 conventionally comprises an outer cladding 17 which is closed by a lower plug 19 and an upper plug 21 and which contains the nuclear fuel. These are, for example, stacked pellets of fuel, the pellets being supported on the lower plug 19.

A helical maintenance spring (not illustrated) may be arranged in the cladding 11 between the upper pellet and the upper plug 21.

FIGS. 3 to 7 illustrate a bottom end-piece 7 according to the invention that may be fitted to an assembly 1 as described with reference to FIGS. 1 and 2. The maintenance grids 13 are grids such as those described in documents U.S. Pat. No. 6,542,567 and EP-925 589. In some variants, the end-piece 1 may further be fitted to assemblies which are different from that described above and/or which comprise different maintenance grids.

The end-piece 7 comprises a horizontal wall 23 and feet 25 that extend the wall 23 downwards in order to be supported on the lower plate of the core of the reactor.

The wall 23 is generally of planar parallelepipedal form and the feet 25 are each arranged at a corner of the wall 23. The wall 23 comprises a lower member 29 and an upper plate 31 which covers the member 29.

The lower member 29 comprises a plurality of units 33 which are arranged at the nodes of the same network as the fuel rods 3, the guide tubes 11 and the instrumentation tube 14.

Figure 3:
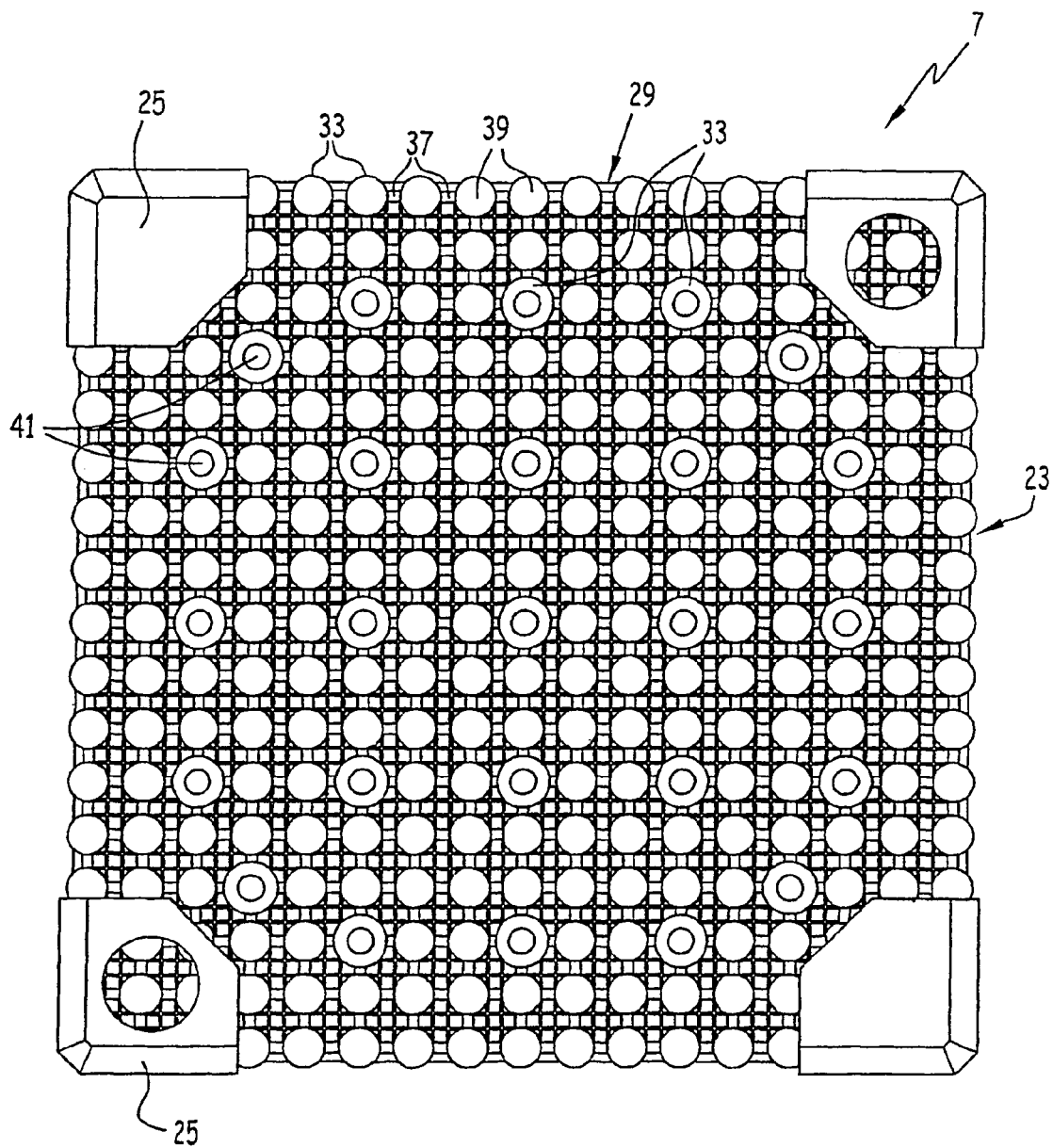
FIG. 3 is a schematic bottom view of the bottom end-piece of a fuel assembly according to a first variant of a first embodiment of the invention.

In this manner, as is visible in FIG. 3, the member 29 comprises 17×17 units 33 of cylindrical shape.

Therefore, each unit 33 is located longitudinally below a fuel rod 3, a guide tube 11 or the instrumentation tube 14, if the assembly 1 comprises them.

The units 33 are connected to each other by reinforcement ribs 37 which form a grid-like square around the lower member 29.

The units 33 that are arranged under the fuel rods 3, have a diameter substantially corresponding to the outer diameter of the rods 3 and are extended downwards by noses 39. Those noses 39 are substantially of ogive-like forms converging downwards. Those noses 39 are integrally formed with the respective units 33.

As provided in FIGS. 3 and 6, the units 33 arranged below the guide tubes 11 and the instrumentation tube 14 do not comprise integrated noses 39, but are instead perforated by vertical holes 41. For each unit 33 arranged under a guide tube 11, the hole 41 is a hole for receiving the shank of a screw 43 for fixing the end-piece 7 to the relevant guide tube 11. It will be appreciated that the head 45 of the screw 43 is substantially of ogive-like form and also constitutes a nose 39 which is arranged under the respective unit 33. It should be noted that the screws 43 have not been illustrated in FIG. 3 for clarity.

The hole 41 of the central unit 33 that is arranged under the instrumentation tube 14 is itself left free in order to allow the introduction of the probe of the instrumentation tube 14.

In this manner, the lower member 29 of the end-piece 7 has a network of noses 39 that is similar to that of the fuel rods 3 and the guide tubes 11.

That network is interrupted only in the region of the instrumentation tube 14. In some variants, the network may also be interrupted locally in the region of that tube 14 in a more significant manner.

In those variants, however, the majority of the rods 3 remain arranged above noses 39.

The units 33 that are arranged below the fuel rods 3 further have blind holes 47 which open in the upper surface of the lower member 29. Those holes 47 have upper portions 49 which diverge upwards.

Figure 5:
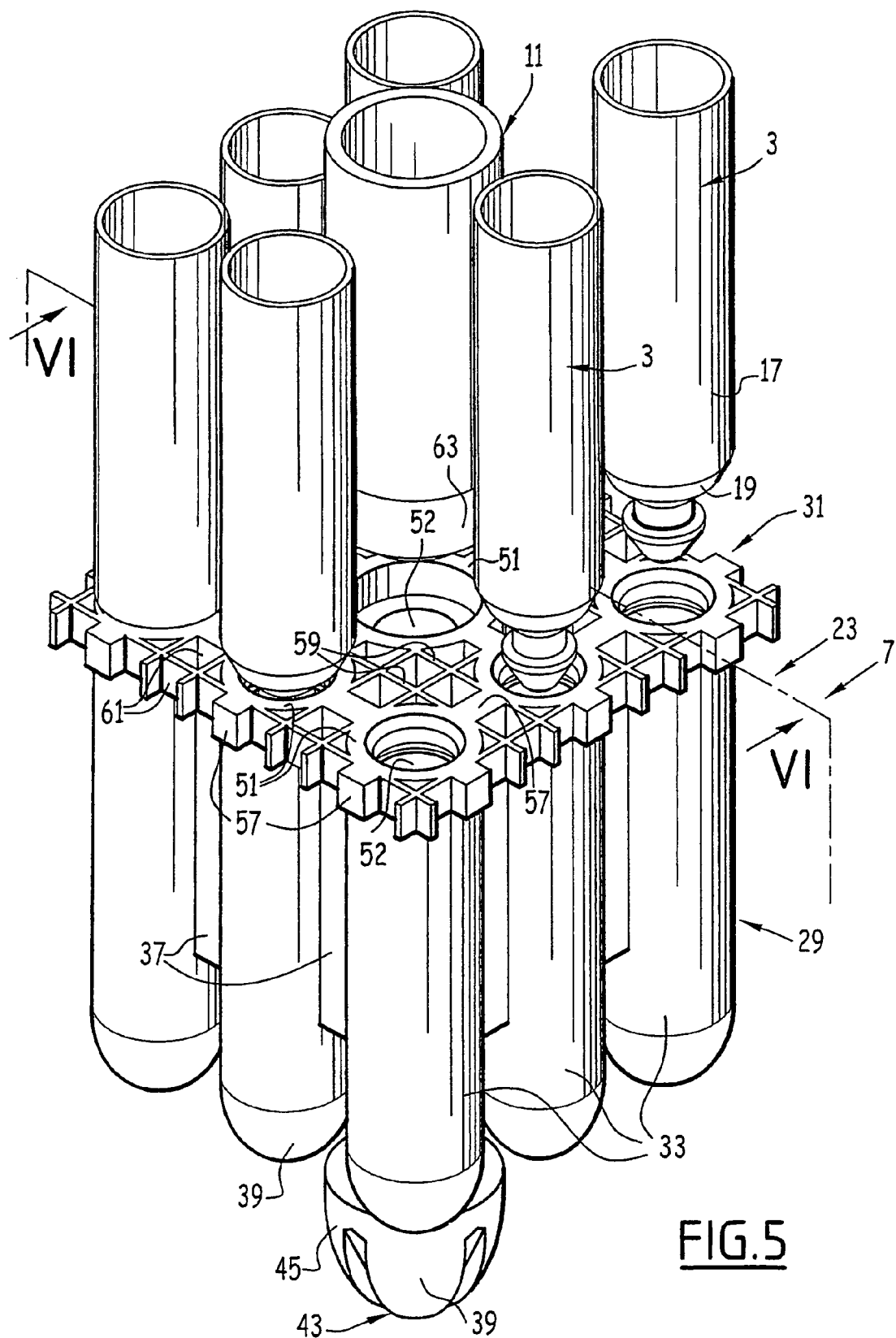
FIG. 5 is a schematic partial, perspective, exploded view showing the connection of the bottom end-piece of FIG. 3 to the fuel rods and the guide tubes.
Figure 6:
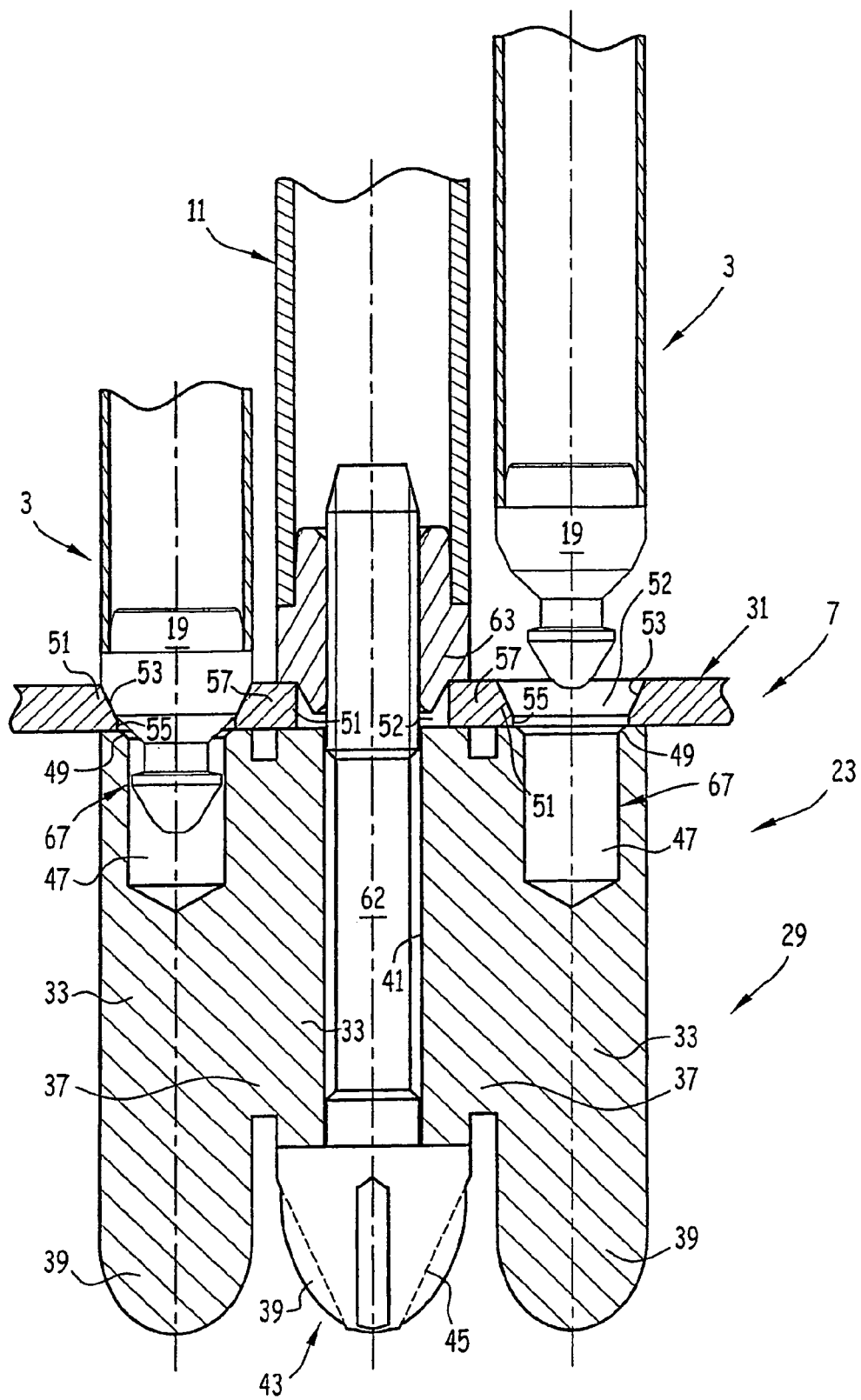
FIG. 6 is a partial, schematic view, sectioned along the plane VI-VI of FIG. 5, illustrating the connection between the bottom end-piece, the guide tubes and the fuel rods.

As illustrated in FIGS. 5 and 6, the upper plate 31 comprises rings 51 that are arranged at the nodes of the same substantially regular network as the units 33. The internal passages 52 of the rings 51 arranged below the fuel rods 3 have upper portions 53 which diverge upwards and substantially cylindrical lower portions 55 that are arranged in a continuation of the upper divergent portions 49 of the blind holes 47. The outer diameter of those rings 51 is substantially equal to that of the rods 3.

The internal passages 52 of the rings 51 arranged under the guide tubes 11 and the instrumentation tube 14 are, for example, of cylindrical form. The outer diameter of those rings 51 is substantially equal to that of the guide tubes 11 and the instrumentation tube 14.

The rings 51 are connected to each other by reinforcement ribs 57 that are arranged, for example, in grid-like form similar to that of the ribs 37 of the lower member 29.

When the upper plate 31 covers the lower member 29 of the end-piece 7, as can be seen in FIGS. 5 and 6, the ribs 57 are arranged above the ribs 37 of the member 29, the rings 51 are arranged above the units 33. Therefore, there is longitudinal continuity between the member 29 and the plate 31.

Plates 59, which are finer than the ribs 57, extend between the rings 51 and the ribs 57 in order to delimit, in the plate 31, holes 61 for the passage and filtration of the coolant water. In the example illustrated, the plates 59 are arranged in grid-like form.

In this manner, the upper plate 31 forms an anti-debris filter.

As illustrated in greater detail in FIGS. 5 and 6, the shanks 62 of the screws 43 for fixing the guide tubes 11 extend through the corresponding holes 41 and are engaged in lower plugs 63 that are fixedly joined to the guide tubes 11. The plugs 63 are then supported on the upper plate 31 and the heads 45 of the screws 43 abut under the lower member 29.

The upper plate 31 and the lower member 29 adjoin each other and the end-piece 7 is fixedly joined to the remainder of the support skeleton 5.

Figure 7:
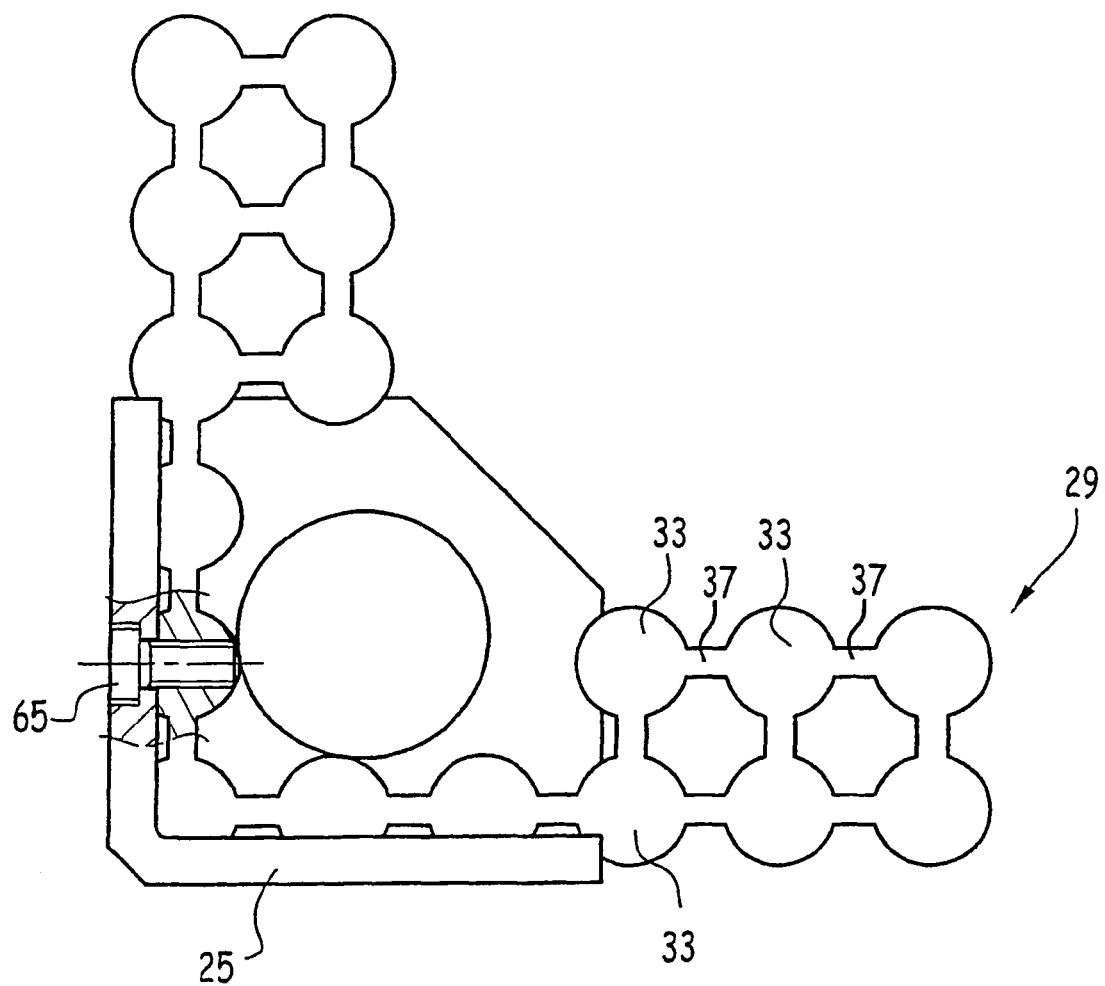
FIG. 7 is a partial, schematic top view illustrating the connection of a foot to the remainder of the bottom end-piece of FIG. 3.

As is visible in FIG. 7, the feet 25 have, for example, been fixed to the corners of the lower member 29 by fixing screws 65.

It will be appreciated that, in FIG. 7, the unit network 33 has been illustrated only partially and the structure thereof has not been shown in detail.

The passages 52 of the rings 51 arranged under the fuel rods 3 and the blind holes 47 of the units 33 arranged below form housings 67 for receiving the lower plugs 19 of the fuel rods 3.

In the example illustrated in FIGS. 3 to 7, the lower plugs 19 are supported on the upper divergent portions 53 of those passages 67 via regions of complementary shape. The rods 3 are thus all maintained laterally via their lower ends relative to the bottom end-piece 7. The upper ends of the rods 3 are, for example, free as in the prior art and are not maintained by the top end-piece 9.

The presence of the noses 39, which are positioned in a continuation of the rods 3 and the guide tubes 11, allows the flow paths to be orientated substantially vertically along the lower ends of the rods 3 and therefore the lateral rates of flow of the water to be reduced.

The vibrations of the lower ends of the rods 3 are thereby reduced during operation of the reactor.

The risks of vibration of the rods 3 are still further reduced because the lower ends of the rods 3 are laterally maintained by the end-piece 7 itself. In this manner, the vibrations of the rods 3 are limited up to such a point that it is possible to dispense with the lower maintenance grid 13.

The risks of damage owing to fretting of the claddings 17 of the fuel rods 3 are therefore limited.

It will be appreciated that the end-piece 7 further has good transparency with respect to the flow of water and therefore does not bring about any great pressure drop.

In general terms, forms other than ogive-like forms may be envisaged for the noses 39 for longitudinally orientating the flow in the region of the lower ends of the rods 3.

Thus, these may be in particular forms which converge towards the bottom, such as conical forms.

Furthermore, the density of the noses 39 may be less than in the example described above, so long as the majority of the rods 3 are arranged above noses 39.

Typically, the bottom end-piece 7 may be constructed from stainless steel or a zirconium alloy.

It can be constructed by any conventional method.

In this manner, the member 29 and the plate 31 can be constructed either by moulding or by a method using abrasive jets of water at a very high pressure (several thousands of bar), the water being able to be loaded with abrasive particles.

Figure 8:
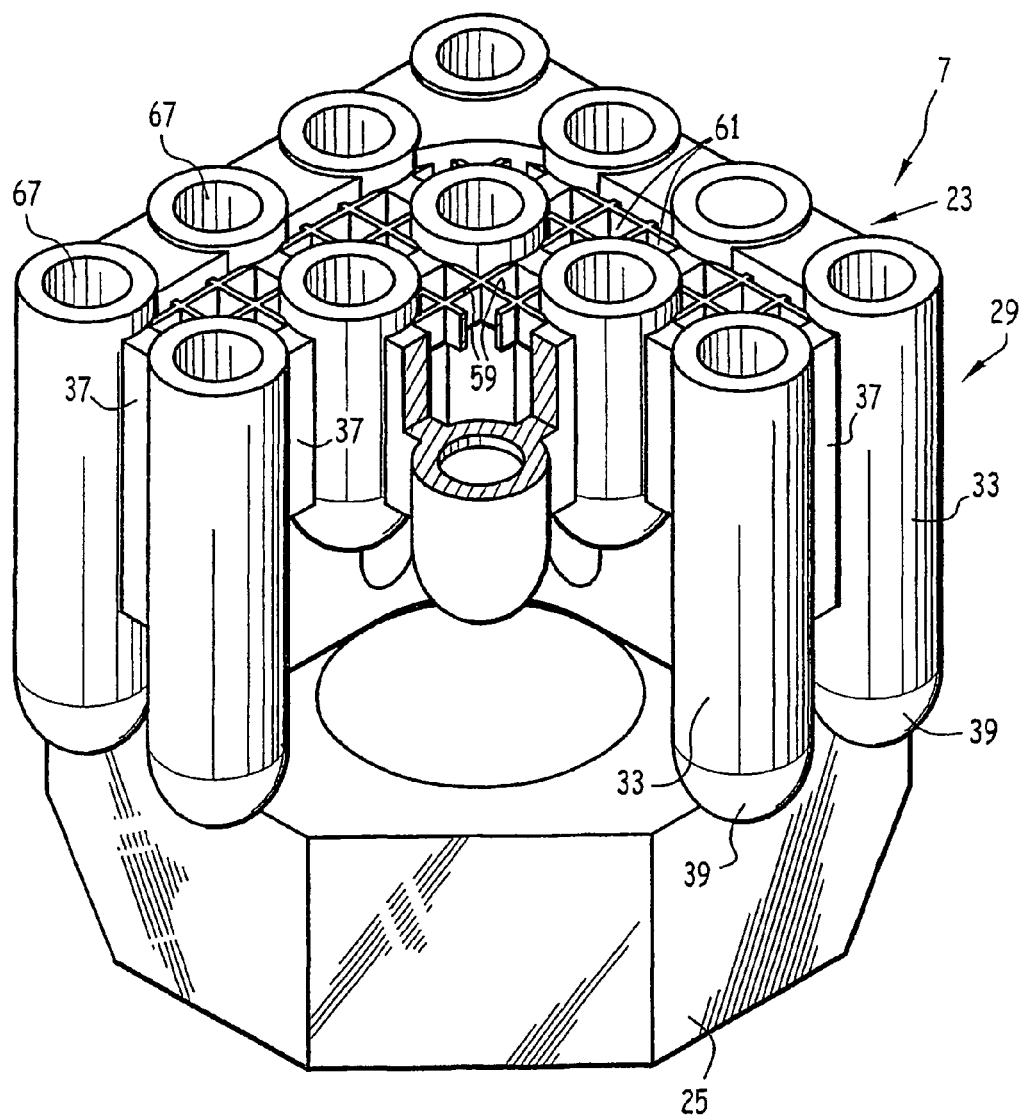
FIG. 8 is a schematic partial perspective view illustrating a second variant of the first embodiment of the invention.

As illustrated by the variant of FIG. 8, the horizontal wall 23 of the bottom end-piece 7 is not necessarily constituted by two portions.

Thus, in this variant, the anti-debris filter is integrated in the member 29, that is to say that the plates 59 extend between the reinforcement ribs 37.

In the variant of FIG. 8, it will also be appreciated that the feet 25 are, similarly to the plates 59, integrally formed with the member 29.

The bottom end-piece 7 is constructed in one piece.

It will also be appreciated that noses 39 arranged in a network substantially corresponding to that of the rods 3 can be used irrespective of the presence on the end-piece 7 of an arrangement for maintaining the lower ends of the rods 3.

Conversely, the maintenance of the rods 3 by the bottom end-piece 7 may be more extensive and may include longitudinal securing, as illustrated by the second embodiment of the invention.

The first variant of this embodiment, illustrated in FIG. 9, differs from that of FIGS. 1 to 7 principally in that the units 33 arranged longitudinally below the fuel rods 3 are extended upwards by projections 71 which are bordered by circular grooves 73.

The lower plugs 19 of the rods 3 are extended downwards by substantially cylindrical rings 75. Those rings 75 are split in order to have resiliently deformable tongues 77.

Each ring 75 is deformed in order to have a curved protuberance constituting a circular enlargement 79.

The inner diameter of the ring 75 is slightly smaller than the outer diameter of the projections 71.

Figure 9:
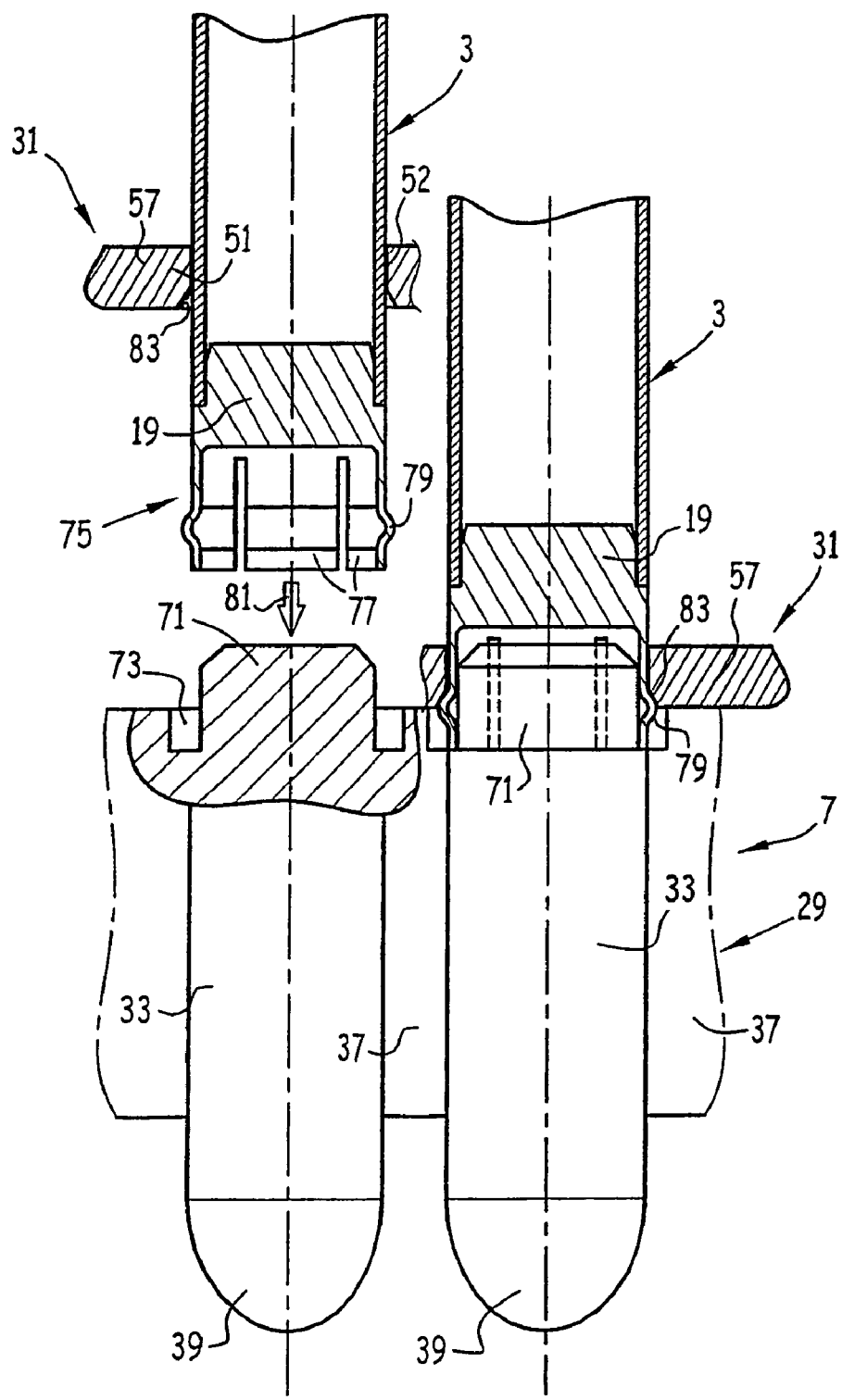
FIG. 9 is a schematic, partially sectioned side view showing a first variant of a bottom end-piece according to a second embodiment of the invention.

In order to assemble the fuel rods 3 at the bottom end-piece 7, it is necessary to proceed as illustrated by the left-hand portion of FIG. 9.

The upper plate 31 has been fitted on the fuel rods 3 beforehand by passing the upper ends of the fuel rods 3 into the internal passages 52 of the rings 51.

Subsequently, the rings 75 are fitted on the projections 71, as indicated by the arrow 81 in the left-hand portion of FIG. 9.

During that fitting operation, the tongues 77 are slightly resiliently deformed in a laterally outward direction.

Next, the upper plate 31 is lowered until it moves into abutment against the lower member 29, as illustrated by the right-hand portion of FIG. 9.

Lower portions 83 of the passages 52 of the rings 51 then move into abutment against the enlargement 79. Those lower portions 83 are, for example, of forms which diverge towards the bottom.

Fixing the bottom end-piece 7 to the guide tubes 11 by the screws 43 described above completes the assembly of the support skeleton 5.

The upper plate 31 is then maintained in a state longitudinally abutting the lower member 29 and thereby longitudinally clamps the lower ends of the rods 3 against the member 29 by the enlargements 79.

All the fuel rods 3 are then secured longitudinally and laterally relative to the bottom end-piece 7, thereby bringing about lateral securing of the rods 3 relative to the end-piece 7, which further reduces the risks of vibrations of the fuel rods 3 and damage owing to fretting.

Figure 10:
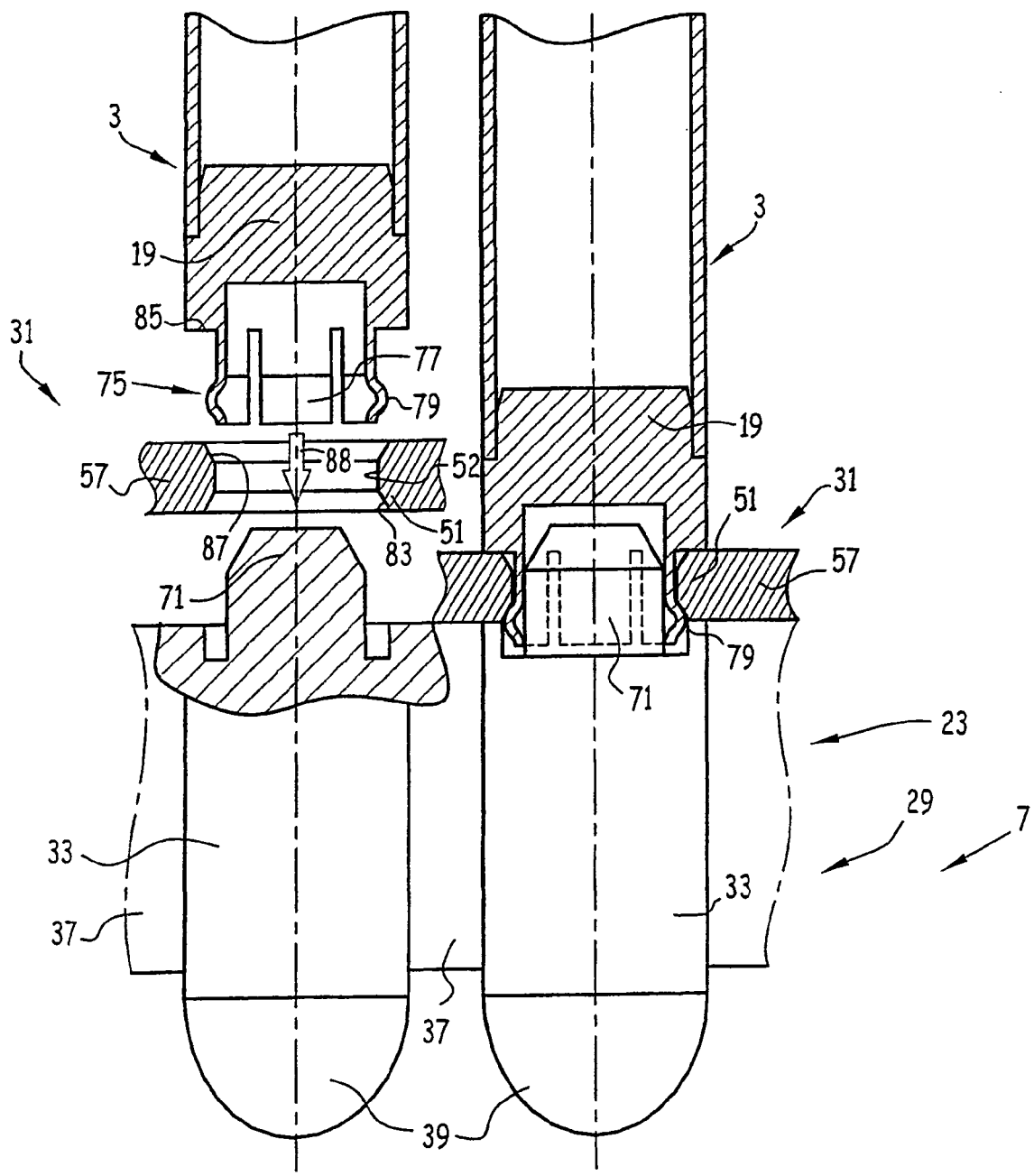
FIGS. 10 to 13 are views similar to FIG. 9 illustrating other variants of the second embodiment of the invention.

FIG. 10 illustrates a second variant of this embodiment.

In this variant, the rings 75 have outer diameters that are reduced further, and are therefore smaller than the outer diameter of the claddings 17 of the fuel rods 3. The rings 75 are connected by shoulders 85 to the lateral surfaces of the lower plugs 19. The central passages 52 of the rings 51 have, in addition to the lower diverging portion 83, an upper portion 87 which diverges towards the top.

The outer diameter of the projections 71 is reduced further than in the first variant of FIG. 9.

In order to assemble the fuel rods 3 at the bottom end-piece 7, first the rings 75 are introduced in the passages 52 of the rings 51 of the grid 31, as indicated by the arrow 88 at the left-hand portion of FIG. 10. During that introduction operation, the tongues 77 become resiliently deformed laterally towards the inner side until the enlargements 79 are positioned below the frustoconical portions 83 and the shoulders 85 abut the upper surface of the anti-debris grid 31. The lower plugs 19 of the rods 3 are then assembled by being engaged with the upper grid 31.

Subsequently, the upper grid 31 is moved into abutment against the lower unit 29 so that the projections 71 are introduced inside the rings 75. The projections 71 prevent deformation of the plates 77 and therefore the lower plugs 19 from being disengaged from the upper plate 31.

Fixing the bottom end-piece 7 to the guide tubes 11 by the screws 43 completes the construction of the support skeleton 5.

In that second variant, the lower ends of the fuel rods 3 are also secured longitudinally and laterally relative to the end-piece 7.

Figure 11:
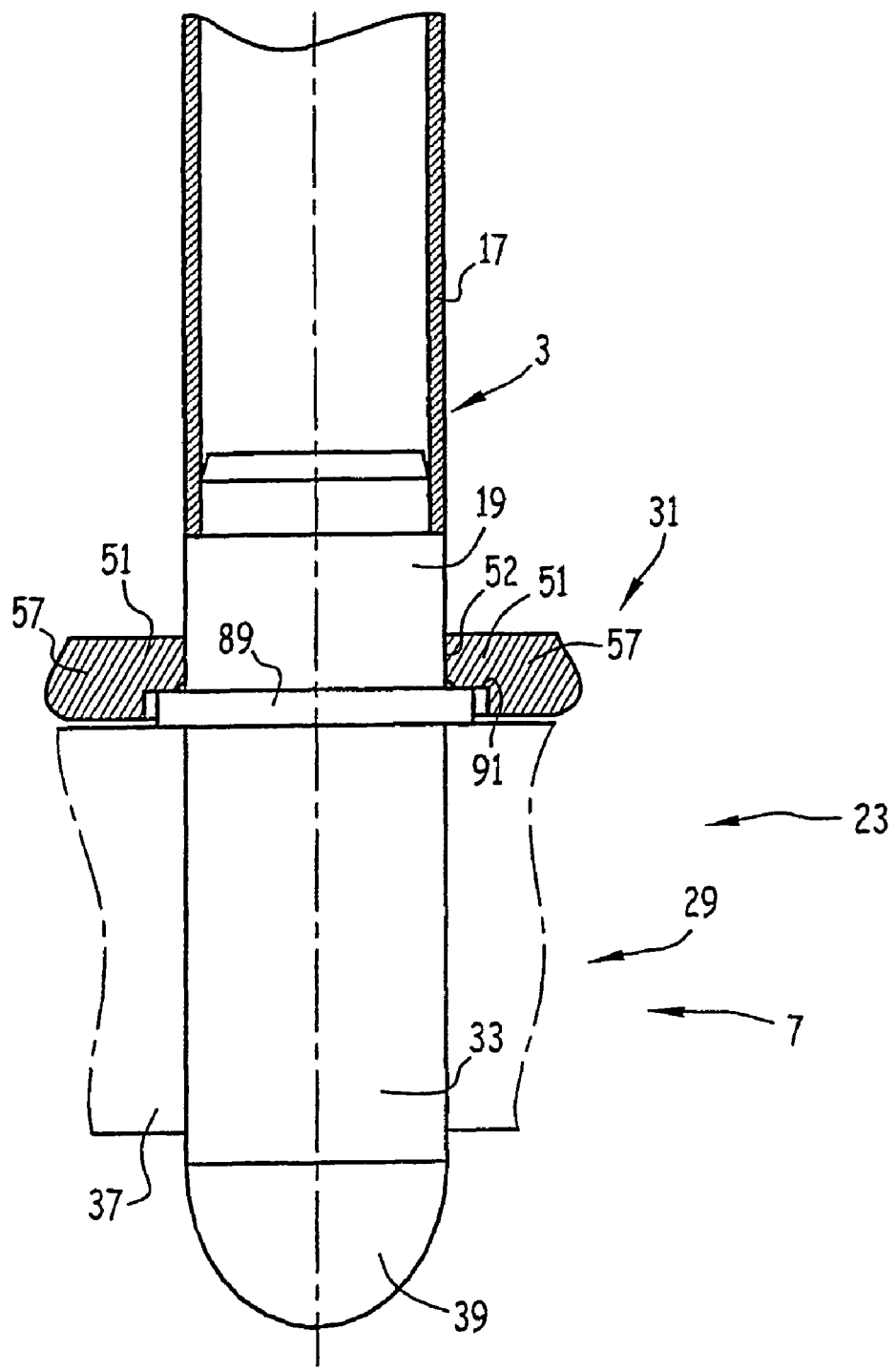

In the third variant of FIG. 11, the lower plugs 19 of the fuel rods 3 comprise widened lower feet 89, for example, in the form of discs having a diameter greater than the outer diameter of the external claddings 17.

After fitting the fuel rods 3, by the upper ends thereof, in the rings 51 of the grid 31, those feet 89 engage in lower countersinkings 91 that are provided in the rings 51. The feet 89, and therefore the lower ends of the fuel rods 3, are therefore secured longitudinally between the lower member 29 of the end-piece 7 and the upper plate 31, by the screws 43 for fixing to the guide tubes 11.

Figure 12:
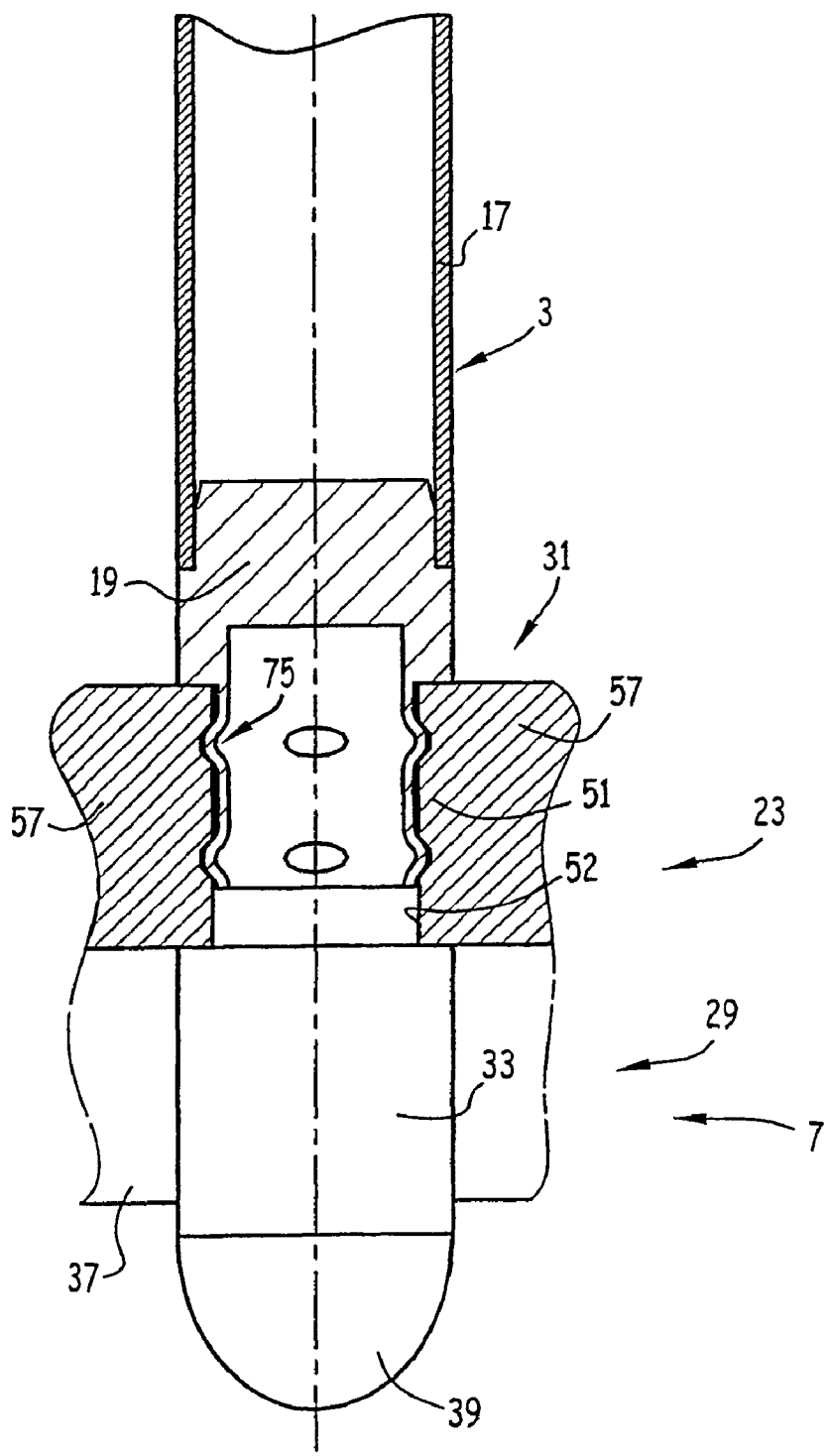

In the variant of FIG. 12, the lower plugs 19 of the fuel rods 3 also comprise rings 75 which, however, are not split. Those rings 75 have been introduced in the passages 52 of the rings 51 and fixed to the rings 51 by expansion-rolling.

The lower ends of the fuel rods 3 are therefore secured longitudinally and laterally to the upper plate 31 of the bottom end-piece 7 which is itself fixed, by the screws 43, to the member 29 of the bottom end-piece 7.

Figure 13:
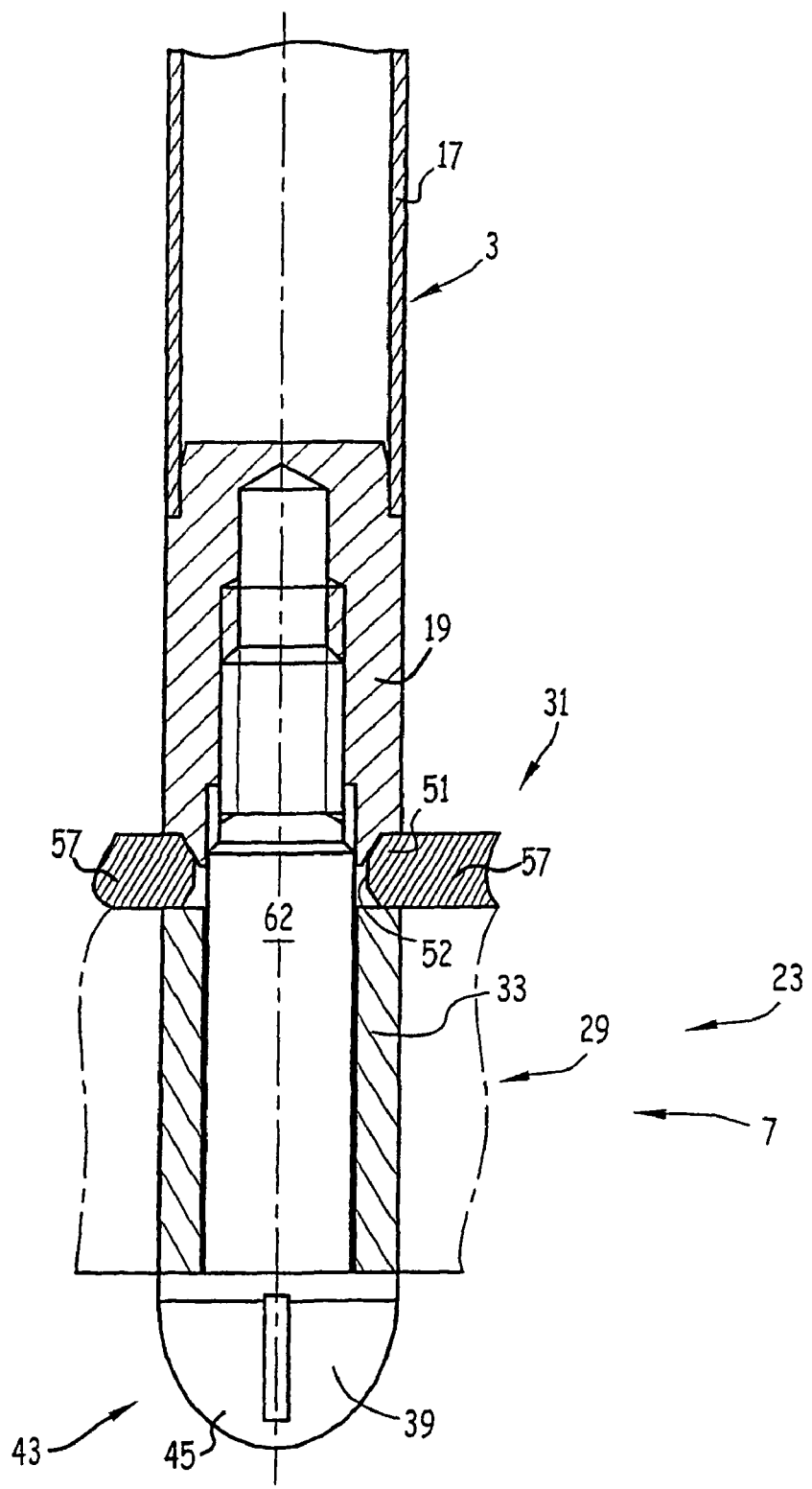

FIG. 13 illustrates still another variant, in which the securing of the fuel rods 3 to the end-piece 7 is brought about by screws 43 similar to those used for fixing to the guide tubes 11.

Thus, each nose 39 arranged below a rod 3 is formed by a head 45 of a screw 43, that has a shank 62 that extends through the corresponding unit 33 and that is screwed in the lower plug 19 of the corresponding rod 3.

In each of the embodiments and in each of the variants described above, it is possible for the end-piece 7 not to comprise an anti-debris filter.

It will again be appreciated that the presence, in the end-piece 7, of a maintaining arrangement, or an arrangement for laterally and/or longitudinally securing all the rods 3, may be envisaged separately from the use of noses 39 for orientating the flow of coolant water along the rods 3 because they independently allow the risks of vibration of the fuel rods 3 to be limited.

In some variants, it is possible for some rods not to be maintained by the end-piece 7, but the majority of the rods remain in a maintained state.

More generally, the principles described above may be used not only for assemblies which are intended for pressurized water reactors, but also for those intended for boiling water reactors (BWR).

The invention claimed is:

1. A fuel assembly for a pressurized water nuclear reactor, the assembly comprising:

fuel rods, the fuel rods having an outer cladding and an upper and a lower plug and having a length and a diameter; and a skeleton for supporting the fuel rods, the fuel rods extending in a longitudinal direction and being arranged at nodes of a substantially regular network, the support skeleton comprising an upper terminal end-piece and a lower terminal end-piece, and guide tubes that connect the upper and lower terminal end-pieces, the guide tubes of the support skeleton having openings for receiving rods of an assembly for controlling and stopping the pressurized water nuclear reactor, the fuel rods being arranged longitudinally between the upper and lower terminal end-pieces, wherein the lower terminal end-piece has a top side and a bottom side, the top side facing the fuel rods and the bottom side being opposite the top side and has noses for orientating flow of a coolant fluid of the reactor along lower ends of the fuel rods, the noses being arranged in the nodes of the substantially regular network in order to be positioned in a longitudinal continuation of at least a majority of the fuel rods of the support skeleton, wherein the noses project from the bottom side of the lower terminal end-piece and converge to be narrower than the diameter of the fuel rods in a direction that is orientated from the top side of the lower terminal end-piece towards the bottom side of the lower terminal end-piece.

2. The assembly according to claim 1, wherein the lower terminal end-piece comprises an arrangement for laterally maintaining lower ends of the fuel rods, wherein the arrangement is configured in nodes of the substantially regular network.

3. The assembly according to claim 2, wherein the arrangement comprises housings that receive the lower ends of the fuel rods.

4. The assembly according to claim 2, wherein the maintaining arrangement is an arrangement for longitudinally securing the lower ends of the fuel rods relative to the lower terminal end-piece.

5. The assembly according to claim 4, wherein the lower terminal end-piece comprises two components that clamp between them the lower ends of the fuel rods.

6. The assembly according to claim 5, wherein the longitudinal securing arrangement comprises projections that are provided on the lower terminal end-piece and rings that are provided at the lower ends of the fuel rods and that are fitted to the projections.

7. The assembly according to claim 6, wherein that the rings comprise relief portions for abutment against one of the components.

8. The assembly according to claim 3, wherein the lower ends of the fuel rods comprise widened feet that are clamped between the two components.

9. The assembly according to claim 2, wherein the lower ends of the fuel rods are expansion-rolled on the lower terminal end-piece.

10. The assembly according to claim 4, wherein the longitudinal securing arrangement comprises screws that abut the lower terminal end-piece and that are engaged in the lower ends of the fuel rods.

11. The assembly according to claim 4, wherein the longitudinal securing arrangement secured by snap-fitting.

12. The assembly according to claim 1 wherein the noses converge to a point.

13. The assembly according to claim 1, wherein the lower terminal end-piece includes a wall integral with first noses of the noses, the wall having holes for the guide tubes, the terminal end-piece further including screws covering the holes for the guide tubes, heads of the screws defining other noses of the noses other than the first noses.

14. The assembly according to claim 1, wherein the nodes are in one of a 14×14, 15×15 and 17×17 pattern.

15. The assembly according to claim 1, further comprising grids of intersecting plates defining cells, the fuel rods arranged in the cells and defining an outer periphery of the fuel assembly between the grids.

16. The assembly as recited in claim 1, further comprising a central instrumentation tube between the upper and lower terminal end-pieces and having an opening for receiving a probe.

17. The assembly as recited in claim 1, wherein the nodes are in a 17×17 pattern, the assembly including at least 24 guide tubes.

18. A fuel assembly for a pressurized water nuclear reactor, the assembly comprising:
fuel rods, the fuel rods having an outer cladding and an upper and a lower plug and having a length and a diameter; and
a skeleton for supporting the fuel rods, the fuel rods extending in a longitudinal direction and being arranged at nodes of a substantially regular network, the support skeleton comprising an upper terminal end-piece and a lower terminal end-piece, and guide tubes that connect the upper and lower terminal end-pieces, the guide tubes of the support skeleton having openings for receiving rods of an assembly for controlling and stopping the pressurized water nuclear reactor, the fuel rods being arranged longitudinally between the upper and lower terminal end-pieces, wherein the lower terminal end-piece has a top side and a bottom side, the top side facing the fuel rods and the bottom side being opposite the top side and has noses for orientating flow of a coolant fluid of the reactor along lower ends of the fuel rods, the noses being arranged in the nodes of the substantially regular network in order to be positioned in a longitudinal continuation of at least a majority of the fuel rods of the support skeleton,
wherein the noses converge to be narrower than the diameter of the fuel rods in a direction that is orientated from the top side of the lower terminal end-piece towards the bottom side of the lower terminal end-piece.

19. The assembly according to claim 18, wherein the noses converge to a point.

20. The assembly according to claim 18, wherein the lower terminal end-piece includes a wall integral with first noses of the noses, the wall having holes for the guide tubes, the terminal end-piece further including screws covering the holes for the guide tubes, heads of the screws defining other noses of the noses other than the first noses.

21. The assembly according to claim 18, wherein the nodes are in one of a 14×14, 15×15 and 17×17 pattern.

22. The assembly according to claim 18, further comprising grids of intersecting plates defining cells, the fuel rods arranged in the cells and defining an outer periphery of the fuel assembly between the grids.

23. The assembly as recited in claim 18, further comprising a central instrumentation tube between the upper and lower terminal end-pieces and having an opening for receiving a probe.

24. The assembly as recited in claim 18, wherein the nodes are in a 17×17 pattern, the assembly including at least 24 guide tubes.

\* \* \* \* \*